US010166447B2

(12) United States Patent
Apatini

(10) Patent No.: US 10,166,447 B2
(45) Date of Patent: Jan. 1, 2019

(54) PROGRESSIVE WEIGHTED AEROBIC PING PONG EXERCISE RACQUET

(71) Applicant: Jules Apatini, New York, NY (US)

(72) Inventor: Jules Apatini, New York, NY (US)

(*) Notice: Subject to any disclaimer, the term of this patent is extended or adjusted under 35 U.S.C. 154(b) by 0 days.

(21) Appl. No.: 15/052,469

(22) Filed: Feb. 24, 2016

(65) Prior Publication Data

US 2016/0243416 A1   Aug. 25, 2016

Related U.S. Application Data

(60) Provisional application No. 62/120,104, filed on Feb. 24, 2015.

(51) Int. Cl.
| | |
|---|---|
| *A63B 59/42* | (2015.01) |
| *G06K 9/00* | (2006.01) |
| *A63B 60/02* | (2015.01) |
| *A63B 15/00* | (2006.01) |
| *A63B 21/06* | (2006.01) |
| *A63B 21/00* | (2006.01) |
| *A63B 71/00* | (2006.01) |

(Continued)

(52) U.S. Cl.
CPC ............. *A63B 59/42* (2015.10); *A63B 15/00* (2013.01); *A63B 60/02* (2015.10); *G06K 9/00342* (2013.01); *A63B 21/00065* (2013.01); *A63B 21/0601* (2013.01); *A63B 21/072* (2013.01); *A63B 21/075* (2013.01); *A63B 71/0054* (2013.01); *A63B 2102/16* (2015.10); *A63B 2209/02* (2013.01); *A63B 2220/17* (2013.01); *A63B 2220/20* (2013.01); *A63B 2220/30* (2013.01); *A63B 2225/12* (2013.01); *A63B 2225/50* (2013.01); *A63B 2225/685* (2013.01); *A63B 2230/75* (2013.01); *H04M 1/7253* (2013.01)

(58) Field of Classification Search
CPC ......... A63B 59/42; A63B 60/02; A63B 15/00; A63B 2102/16; A63B 21/00065; A63B 21/0601; A63B 21/072; A63B 21/075; A63B 71/0054; A63B 2209/02; A63B 2220/17; A63B 2220/20; A63B 2220/30; A63B 2225/50; A63B 2225/685; A63B 2230/75; A63B 59/40; A63B 2102/08; A63B 60/42; A63B 2024/0015; A63B 2024/004; A63B 2220/833; G06K 9/00342; H04M 1/7253
USPC .............................................. 482/93; 473/527
See application file for complete search history.

(56) References Cited

U.S. PATENT DOCUMENTS

| | | | | |
|---|---|---|---|---|
| 3,330,560 | A * | 7/1967 | Higdon | A63B 60/02 473/256 |
| 6,409,616 | B1 * | 6/2002 | Lin | A63B 69/38 473/463 |

(Continued)

*Primary Examiner* — Andrew S Lo
(74) *Attorney, Agent, or Firm* — Boag | Law, PLLC

(57) ABSTRACT

An enhanced table tennis racket is disclosed that incorporates features for enhancing the aerobic exercise value of the game. One or more weights may be attached, removably or permanently, to the racket. In alternative embodiments, a mobile computer device such as a smartphone may be fitted in a recess formed in the racked and may track the movement of the racket. Mobile application software may provide data processing and reporting functions. A computing device in communication with the mobile computing device may receive data concerning the racket for demonstration or analysis purposes.

15 Claims, 4 Drawing Sheets

300

(51) Int. Cl.
*H04M 1/725* (2006.01)
*A63B 21/072* (2006.01)
*A63B 21/075* (2006.01)
*A63B 102/16* (2015.01)

(56) References Cited

U.S. PATENT DOCUMENTS

| | | | | |
|---|---|---|---|---|
| 7,559,861 B2 * | 7/2009 | Yoshihara | ............... | A63B 59/40 473/527 |
| 8,858,372 B1 * | 10/2014 | Trieu | ..................... | A63B 59/04 473/527 |
| 2002/0068652 A1 * | 6/2002 | Sims | .................. | A63B 71/0669 473/524 |
| 2007/0032318 A1 * | 2/2007 | Nishimura | ......... | A63B 24/0021 473/570 |
| 2007/0105666 A1 * | 5/2007 | Fernandez | ............. | A63B 49/00 473/553 |
| 2012/0015765 A1 * | 1/2012 | Feng | ..................... | A63B 59/40 473/551 |
| 2012/0157241 A1 * | 6/2012 | Nomura | ............. | A63B 69/0002 473/422 |
| 2013/0217520 A1 * | 8/2013 | Gaede | .................... | A63B 69/38 473/459 |
| 2014/0221134 A1 * | 8/2014 | Giegerich | .............. | A63B 59/04 473/527 |
| 2014/0290332 A1 * | 10/2014 | Yamashita | ............. | A63B 69/36 73/11.01 |
| 2014/0378250 A1 * | 12/2014 | Shocklee, Jr. | ...... | A63B 69/0002 473/457 |
| 2015/0335978 A1 * | 11/2015 | Syed | .................. | A63B 24/0003 473/223 |
| 2015/0360081 A1 * | 12/2015 | Zhao | .................. | A63B 24/0021 473/231 |
| 2016/0101335 A1 * | 4/2016 | Lam | ....................... | A63B 69/00 473/519 |
| 2016/0250533 A1 * | 9/2016 | O'Rourke | ............. | A63B 59/45 473/527 |
| 2017/0007902 A1 * | 1/2017 | Cottam | ................. | G06F 19/3481 |
| 2017/0065862 A1 * | 3/2017 | Lin | ........................ | A63B 60/46 |

* cited by examiner

PROGRESSIVE WEIGHTED AEROBIC PING PONG EXERCISE RACQUET

PRIORITY CLAIM

This application claims priority to U.S. Patent Application No. 62/120,104, filed Feb. 24, 2015, and titled, "PROGRESSIVE WEIGHTED AEROBIC PING PONG EXERCISE RACQUET," the contents of which is incorporated by reference in its entirety.

BACKGROUND

The following is a simplified summary of the disclosure in order to provide a basic understanding of some of its aspects. This summary is not an extensive overview of the disclosure. It is intended to neither identify key or critical elements of the disclosure, nor delineate any scope of the particular implementations of the disclosure or any scope of the invention. Its sole purpose is to present some concepts of the disclosure in a simplified form as a prelude to the more detailed description presented later.

Table tennis (also known commercially as ping pong) finds its roots in 19th Century English aristocracy. It is the most popular racket sport in the world, with an estimated 300 million active players worldwide, 20 million of whom are in the United States. In a game of table tennis, players hit a small ball back and forth across a table that can vary in size, but is generally 9.0 feet long, 5.0 feet wide, and 2.5 feet in height. Players may use a laminated wooden racket (also known as a paddle or bat) to hit the ball over a net placed at the center of the table across the width. Points are awarded when the receiving player is unable to return the ball, when the ball is hit outside of the table area, or in other situations.

The International Table Tennis Federation (ITTF) is the worldwide governing body for the sport. Complete rules may be found at www.ittf.com. USA Table Tennis (USATT) is the governing body for the sport in the United States.

Participants in table tennis find that participating in the sport provides many benefits, including recreation, fitness, improved hand-eye coordination, cross-generational interaction, and intergenerational play.

As with many sports, competing at a high level may require the participant to develop certain skills, such as proper forehand and backhand form, ball control, grip, and stance. Developing these skills can take many years of practice.

Because many may view table tennis as a recreational pursuit, it may be impractical for a participant to devote the time necessary to advance to the next skill level. Players may not want to travel to their local table tennis facility for instruction.

Even where players participate in table tennis for its health and fitness benefits, the sport can be insufficiently vigorous for those participants seeking a greater fitness challenge.

Accordingly, there is a need for a system and method of participating in table tennis that enables participants to increase their skill level rapidly.

There is a further need for a form of table tennis that provides players with enhanced training in a comfortable and familiar environment.

There is also a need for a form of table tennis that provides increased fitness and health benefits, or enables players to maximize the available fitness and health benefits.

BRIEF DESCRIPTION OF THE DRAWINGS

The features and advantages of the present disclosure will be more fully understood with reference to the following detailed description when taken in conjunction with the accompanying figures, wherein.

SUMMARY

Figure 1:
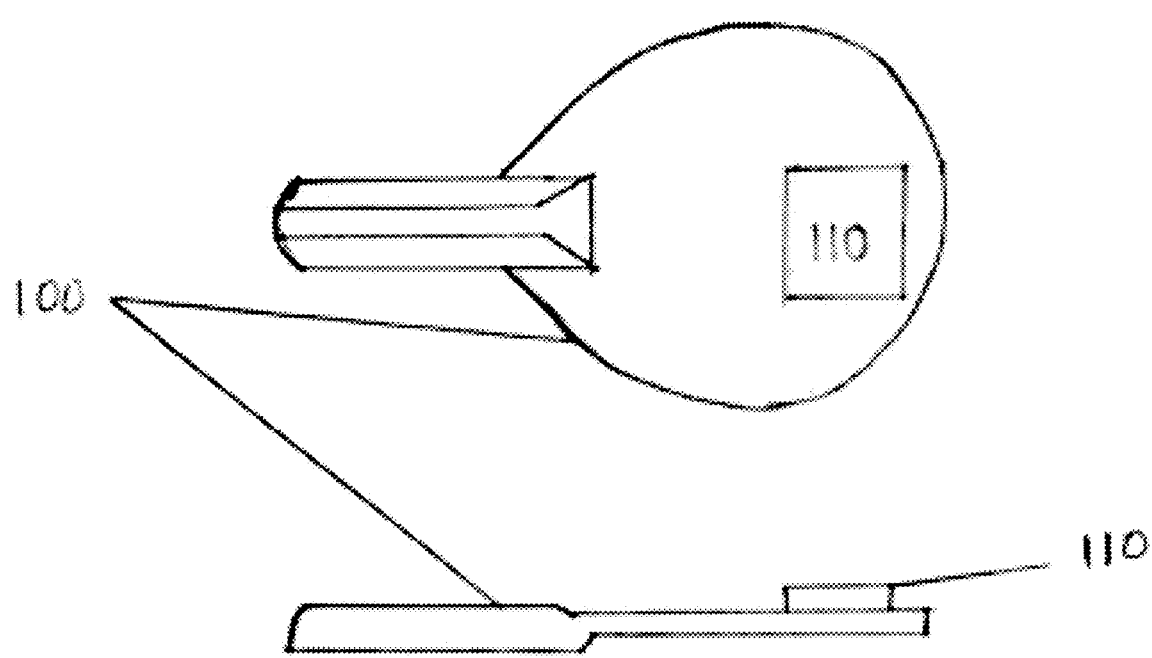
FIG. 1 is schematic diagram of a plan and side view of an embodiment of the present invention.

In some embodiments, an enhanced table tennis racket may include a blade portion with an elongated handle portion and a striking surface, a surface covering on at least a portion of the striking surface, and/or a recess formed in the blade portion for receiving and securing a mobile computing device.

In some embodiments, such a racket may further include one or more weights attached to the blade portion, which weights may be removably attached to the blade portion at a periphery of the striking surface.

In some embodiments, the blade portion is fitted with one or more clips for receiving a group of removable weights, and the weights may be metal discs.

In some embodiments, such a racket may further include a spacer for varying the volume of the recess to provide a secure fit to the mobile computing device, and the space may be adjustable. In some embodiments, the mobile computing device is a smartphone.

In some embodiments, an enhanced table tennis racket may include a blade portion, a surface covering on at least a portion of the striking surface, and/or a weight attached to one side of the blade portion.

In some embodiments, the blade portion may include an elongated handle portion and a striking surface, and may further include one or more weights attached to the blade portion.

In some embodiments, the one or more weights are removably attached the blade portion at a periphery of the striking surface. In some embodiments, the blade portion is fitted with one or more clips for receiving a group of removable weights, and the weights may be metal discs.

In some embodiments, a system for performing aerobic activity may include an enhanced table tennis racket and/or mobile application software that is configured to receive data from motion sensors in the mobile computing device, calculate metrics relative to the movement of the racket during the activity, and store data the metrics. In some embodiments, the performance metrics may include one of elapsed time, calories burned, racket speed, number of strokes, and distance traveled.

In some embodiments, the racket may further include one or more weights that are removably attached to the blade portion, and the weights may be metal discs.

In some embodiments, the enhanced table tennis racket may include a blade portion and a striking surface, and may include a recess for receiving a mobile computing device. In some embodiments, such a system may further include a mobile computing device installed in the recess and running the mobile application software.

In some embodiments, such a system may further include a spacer for varying the volume of the recess to provide a secure fit to the mobile computing device.

In some embodiments, such a system may further include a computing device in communication with the mobile computing device. In some embodiments, the computing device is configured to wireless receive data from the mobile computing device relative to the movement of the racket.

DETAILED DESCRIPTION

In embodiments, the system and method of the present invention comprises a modified table tennis racket, mobile computing device, and mobile application software installed on the mobile computing device. In embodiments, the system and method may involve remote servers that provide analysis of performance, social media, or other content.

In embodiments, an enhanced table tennis racket is provided.

In embodiments, a table tennis racket can comprise a blade portion and a surface coating. Blade portion includes a substantially round hitting surface and an elongated handle portion extending from the hitting surface.

Blade portion may be formed from any durable, lightweight material, preferably made from a laminated natural wood such as ash, Douglas Fir, cypress, poplar, spruce, or similar hardwood. In embodiments, additives such as carbon fiber or glass fiber may be integrated into the natural wood to provide certain characteristics such as enhanced hardness. In embodiments, blade portion is formed from 5-9 layers of wood or wood composite sealed with a surface treatment. One exemplary surface treatment is lamination and treatment with a surfactant. A rubber surface coating may be applied to blade portion on one or both sides to enhance performance.

In embodiments, racket is fitted with one or more weights to increase the overall weight of the racket. Referring to FIG. 1, an exemplary weighted table tennis racket 100 is shown. A weight 110 may be attached to the distal end of the paddle portion opposite the handle on either side of the blade portion. In alternate embodiments, weight(s) may be positioned in various locations across the device.

Weight may be attached to the surface of paddle by adhesive, screws, nails, fasteners, or any other mechanism sufficient to maintain a secure and safe connection between the weight and the paddle. In embodiments, weight may be permanently attached or removable.

The amount of weight utilized with the system and method of the present invention may vary depending on the player and/or intended results. For example, an adult male player looking for strength training benefits may use 20 pounds, while a teenage girl practicing may use only 5 pounds. The weights selected will only depend on the physical characteristics of the player.

Those skilled in the art will appreciate that weights of any type and variety may be used with the present invention. Preferably, weights should be aesthetically pleasing and free from sharp edges so as to reduce the likelihood of injury.

Figure 2:
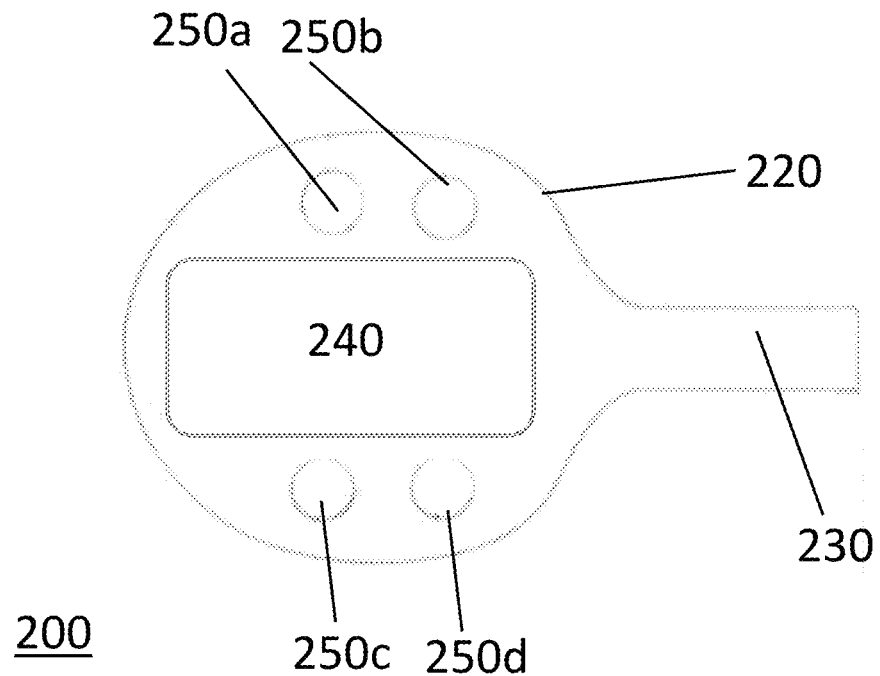
FIG. 2 shows an alternate embodiment of the present invention.

Referring to FIG. 2, an alternate embodiment is shown.

In the embodiments of FIG. 2, the periphery of blade portion 220, excluding the handle 230, may be fitted with a plurality of small weights 250a-250d, the number and mass of which will depend on the application. In embodiments, these small weights may be coins inserted into the periphery of the racket, which has been fitted to receive and hold the coins.

In embodiments, the present invention may be used for aerobic exercise, with the added weight providing increased resistance and more strenuous activity as compared to play with a standard racket.

In embodiments, the present invention may be used for strength training. The added weight may provide benefits similar to a traditional gym weight, but in the context of a table tennis movement.

In embodiments, the present invention may be used as part of a pre-match warm-up. Much like a baseball player using a weighted bat in the on-deck circle, a user could go through a series of movements that he or she expects will occur in the match. By using the weight with these pre-match movements, the user may loosen muscles, increase speed, fine-tune movements, reduce injury or even provide a restful few moments before the match. In embodiments, the present invention may be used as a training exercise. Like the pre-match warm-up, incorporating weights into a training regimen can improve performance. When utilized over time, the present invention can also increase strength in the areas used during play.

Figure 3:
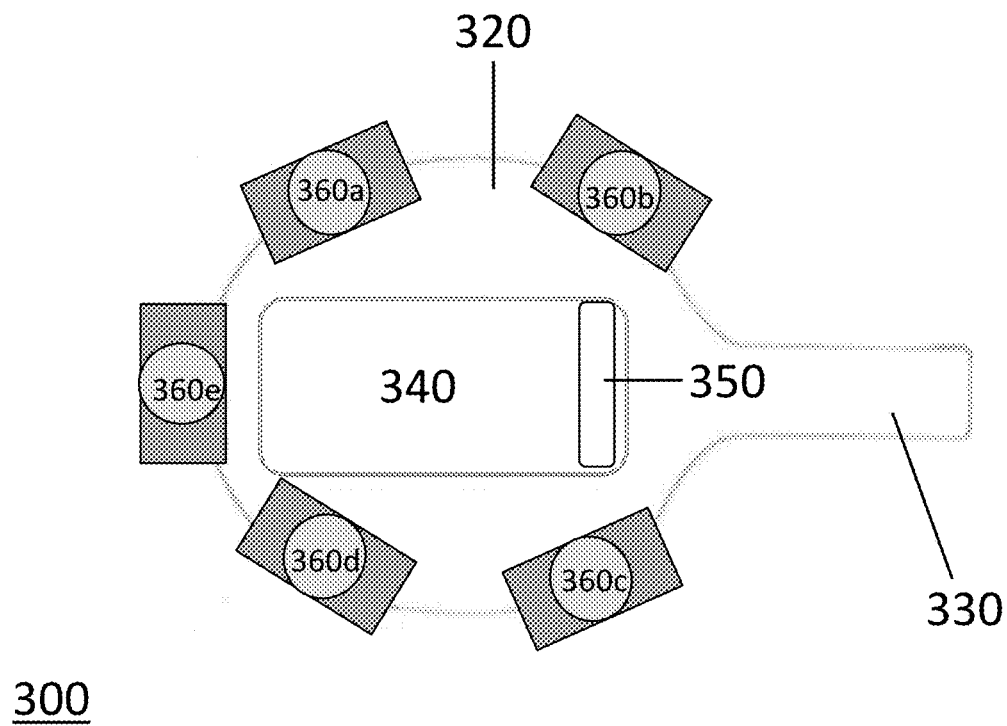
FIG. 3 shows a variation of the embodiment of FIG. 2.

Referring to FIG. 3, a further alternate embodiment is shown.

In the embodiment of FIG. 3, racket 300 has been formed with a recess 340 sized to receive a smartphone device. Various rackets may be commercialized to work with various smartphones, or a single adjustable racket type may be offered that has been adapted to receive smartphones of various sizes. Spacer or insert 350 may also be employed to enable the device to work with smartphones of multiple sizes. In some embodiments, the blade portion 320 is fitted with one or more clips 360a-360e for receiving a group of removable weights, and the weights may be metal discs.

In the FIG. 3 embodiment, a training and fitness regimen may incorporate a mobile app running on the device that, for example, receives data from the smartphones accelerometer, gyroscope, or other sensor to detect and monitor the user's movement. Mobile app may process this data to evaluate the user's performance, looking at elements like form and speed. Mobile app may also monitor other metrics, such as total time elapsed during a practice session, the number of strokes, the maximum stroke speed, pressure applied, or any other metric that can be devised from the available sensor data.

In embodiments, mobile app may incorporate a training regimen that monitors the user's performance over time and provides feedback to the user. In alternate embodiments, mobile app may be integrated into a competition against other players and measure performance against others. In still further embodiments, mobile app may be recreational in nature and allow users to share performance data directly or via social media.

For any of the embodiments shown herein, various customizations may be available and remain within the scope of the invention.

Embodiments of the present invention may be employed with various blade portion configurations. Blade portion may be further configured for a player's individual preferences, such as grip style (e.g., Western or pen hold), handle shape, materials used, and so forth.

In embodiments, racket used with the system and method of the present invention may be formed in a variety of colors, styles, and textures to appeal to a broad audience. In embodiments, racket may incorporate Day-Glo or fluorescent coloring. In alternate embodiments, racket may be configured to reflect blacklight wavelengths to provide further entertainment value.

In embodiments, systems and methods of the present invention may be incorporated into an organized exercise program involving table tennis, which program may incorporate with live instruction and/or digital media such as streaming video, podcasts, or web sites, among others.

Figure 4A:
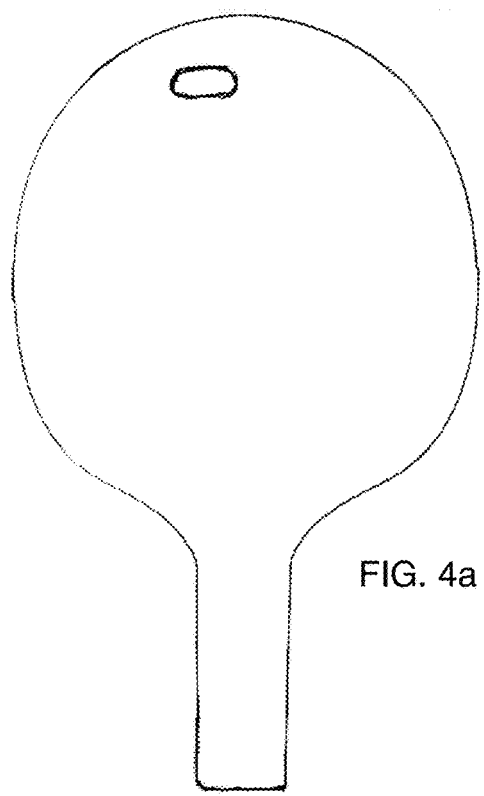
FIGS. 4a-4b show a further embodiment of the invention.
Figure 4B:
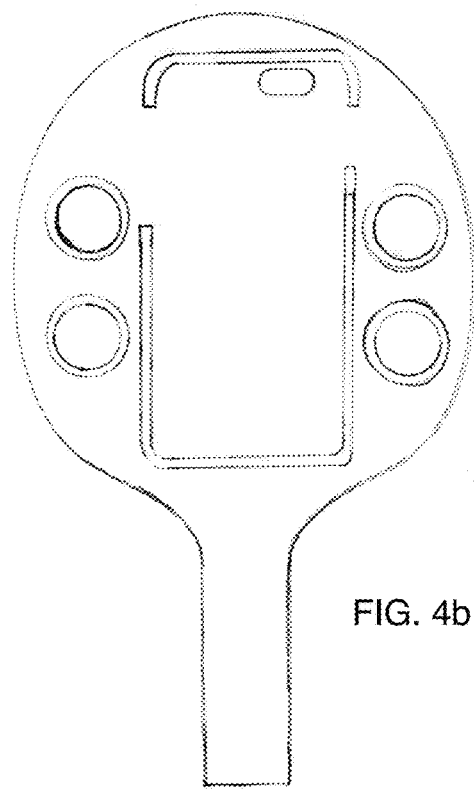

Referring to FIGS. 4a and 4b, an alternate embodiment is shown in which a recess if formed between two halves of a racket.

In embodiments, the present invention may be incorporated into the promotion or demonstration system. A tablet kiosk may be provided for wirelessly communicating with racket and mobile computing device. Connection may be by WiFi, Bluetooth, RF, or any other conventional wireless connection. An amplifier and microphone may also be provided for narrating the demonstration.

The operator may conduct the demonstration, which may be recorded on the tablet or mobile computing device. In addition to voice or video, the recording may include data broadcast from the racket via the mobile computing device.

In embodiments, a kiosk system may be provided to record video of participants executing training exercises or other uses of the system so that they may later observe whether they performed the moves correctly. Data from the racket and mobile computing device may be integrated into the replay or instruction.

In embodiments, a demonstration system may be used without recording, to provide instruction to participants or prospective instructors.

It will be understood that there are numerous modifications of the illustrated embodiments described above that will be readily apparent to one skilled in the art, such as many variations and modifications of the system and/or its components including combinations of features disclosed herein that are individually disclosed or claimed herein, explicitly including additional combinations of such features, or alternatively other types of components. Also, there are many possible variations in the components and configurations. These modifications and/or combinations fall within the art to which this invention relates and are intended to be within the scope of the claims, which follow. It is noted, as is conventional, that the use of a singular element in a claim is intended to cover one or more of such an element.

I claim:

1. An enhanced table tennis racket comprising:
   a blade portion with an elongated handle portion and a striking surface;
   a surface covering on at least a portion of said striking surface;
   a recess formed in said blade portion for receiving and securing a mobile computing device; and
   a spacer for varying a volume of said recess to provide a secure fit to said mobile computing device, and
   wherein said mobile computing device is a smartphone or tablet.

2. The racket of claim 1 further comprising one or more weights attached to said blade portion.

3. The racket of claim 2 wherein said one or more weights are removably attached to said blade portion at a periphery of said striking surface.

4. The racket of claim 2 wherein said blade portion is fitted with one or more clips for receiving a plurality of removable weights.

5. The racket of claim 4 wherein said weights are metal discs.

6. An enhanced table tennis racket comprising:
   a blade portion comprising an elongated handle portion and a striking surface;
   a surface covering on at least a portion of said striking surface;
   a weight attached to one side of said blade portion; and
   wherein said blade portion further comprises a recess for receiving a smartphone and further wherein said racket functions as a smartphone cover.

7. The racket of claim 6 wherein said one or more weights are removably attached said blade portion at a periphery of said striking surface.

8. The racket of claim 6 wherein said blade portion is fitted with one or more clips for receiving a plurality of removable weights.

9. The racket of claim 8 wherein said weights are metal discs.

10. A system for performing aerobic activity comprising:
    an enhanced table tennis racket comprising a blade portion and a striking surface, wherein said blade portion comprises a recess for receiving a mobile computing device;
    mobile application software that is configured to receive data from motion sensors in said mobile computing device, calculate metrics relative to the movement of said racket during the activity, and store data of said metrics; and
    a mobile computing device installed in said recess and running said mobile application software.

11. The system of claim 10 wherein said racket further comprises one or more weights that are removably attached to said blade portion.

12. The system of claim 11 wherein said weights are metal discs.

13. The system of claim 10 further comprising a spacer for varying a volume of said recess to provide a secure fit to said mobile computing device.

14. The system of claim 10 wherein said metrics include one of elapsed time, calories burned, racket speed, number of strokes, and distance traveled.

15. The system of claim 10 further comprising a computing device in communication with said mobile computing device wherein said computing device is configured to wireless receive data from said mobile computing device relative to the movement of said racket.

* * * * *